US011392702B2

(12) United States Patent
Mugundan et al.

(10) Patent No.: US 11,392,702 B2
(45) Date of Patent: Jul. 19, 2022

(54) DISCOVERY AND MATCHING OF INTERNET OF THINGS (IOT) DEVICES AND SERVICES USING A SECURE GLOBAL REGISTRY

(71) Applicant: Microsoft Technology Licensing, LLC, Redmond, WA (US)

(72) Inventors: Balendran Mugundan, Redmond, WA (US); Affan Arshad Dar, Redmond, WA (US); Anush Prabhu Ramachandran, Woodinville, WA (US); Raimundo Robledo Pontes Filho, Redmond, WA (US); Rajeev Mandayam Vokkarne, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 16/355,780

(22) Filed: Mar. 17, 2019

(65) Prior Publication Data

US 2020/0293663 A1    Sep. 17, 2020

(51) Int. Cl.
*G06F 21/57*    (2013.01)
*G06F 16/182*    (2019.01)
(Continued)

(52) U.S. Cl.
CPC ........ *G06F 21/575* (2013.01); *G06F 16/1824* (2019.01); *G06F 21/44* (2013.01); *H04L 9/0819* (2013.01); *H04L 2209/38* (2013.01)

(58) Field of Classification Search
CPC .... G06F 16/1824; G06F 21/44; G06F 21/575; H04L 2209/38; H04L 2209/805;
(Continued)

(56) References Cited

U.S. PATENT DOCUMENTS 6,871,210 B1 * 3/2005 Subramanian .......... H04L 29/06
709/200
8,316,237 B1 * 11/2012 Felsher et al. ...... H04L 63/0442
713/171
(Continued)

FOREIGN PATENT DOCUMENTS

WO    2016200535 A1    12/2016

OTHER PUBLICATIONS

"Decentralized Identifiers (DIDs) v0.11", Retrieved from: https://w3c-ccg.github.io/did-spec/, Mar. 15, 2019, 42 Pages.
(Continued)

*Primary Examiner* — Jaweed A Abbaszadeh
*Assistant Examiner* — Brian J Corcoran
(74) *Attorney, Agent, or Firm* — Rainier Patents, P.S.

(57) ABSTRACT

Described herein is a device (e.g., IoT device) having bootstrap code that communicates with a secure global registry (e.g., private distributed shared blockchain database). The bootstrap code of the device uses a globally unique device identifier of the device to the secure global registry. The bootstrap code receives information from the secure global registry which the bootstrap code uses to obtain information to connect to a cloud-based endpoint. The bootstrap code can download an appropriate software development kit (SDK) associated with the particular cloud based, at least in part, upon the received information. The device can be registered in the secure global registry by creating a globally unique identifier for the device. An initial entry can be created in the secure global registry comprising the globally unique identifier, with the secure global registry stores current cloud-based endpoint information, if any, for the device.

20 Claims, 7 Drawing Sheets

(51) Int. Cl.
*G06F 21/44* (2013.01)
*H04L 9/08* (2006.01)

(58) Field of Classification Search
CPC ..... H04L 63/123; H04L 67/12; H04L 9/0819; H04L 9/3239
See application file for complete search history.

(56) References Cited

U.S. PATENT DOCUMENTS

| | | | |
|---|---|---|---|
| 9,483,312 B2 | 11/2016 | Bailey et al. | |
| 2004/0255110 A1* | 12/2004 | Zimmer | G06F 9/4405 713/2 |
| 2005/0071677 A1* | 3/2005 | Khanna | H04L 67/34 726/4 |
| 2005/0149924 A1* | 7/2005 | Komarla | G06F 21/575 717/176 |
| 2007/0083748 A1* | 4/2007 | Erickson | G06F 9/4416 713/2 |
| 2009/0144074 A1 | 6/2009 | Choi | |
| 2009/0276620 A1* | 11/2009 | McCarron | H04L 9/3215 713/155 |
| 2015/0156266 A1 | 6/2015 | Gupta | |
| 2016/0205097 A1 | 7/2016 | Yacoub et al. | |
| 2017/0345019 A1 | 11/2017 | Radocchia et al. | |
| 2017/0359338 A1 | 12/2017 | Tschofenig et al. | |
| 2018/0089436 A1* | 3/2018 | Smith et al. | G06F 21/575 |
| 2018/0091524 A1 | 3/2018 | Setty et al. | |
| 2018/0183587 A1* | 6/2018 | Won | H04W 12/0433 |
| 2018/0375665 A1 | 12/2018 | Contenti et al. | |
| 2019/0013948 A1 | 1/2019 | Mercuri et al. | |
| 2019/0044700 A1 | 2/2019 | Leddy | |
| 2019/0081791 A1* | 3/2019 | van der Maas | H04L 9/0866 |
| 2019/0311108 A1* | 10/2019 | Achkir et al. | H04L 9/0637 |
| 2020/0059353 A1* | 2/2020 | Liu | H04L 9/0643 |

OTHER PUBLICATIONS

Buchner, et al., "decentralized-identity/identity-hub", Retrieved from: https://github.com/decentralized-identity/identity-hub/blob/master/explainer.md, Sep. 7, 2018, 3 Pages.

Skerrett, Ian, "Multi-Cloud for IoT", Retrieved from: https://dzone.com/articles/multi-cloud-for-iot, Oct. 3, 2018, 3 Pages.

W3C Credentials Community Group, "Decentralized Identifiers (DIDs) v0.11", retrieved from: https://w3c-ccg.github.io/did-spec, on Feb. 25, 2019, 22 pages.

Microsoft, "Decentralized Identity, Own and Control Your Identity", Retrieved from: https://hub.packtpub.com/microsoft-announces-decentralized-identity-in-partnership-with-dif-and-w3c-credentials-community-group/, dated Oct. 12, 2018, 23 pages.

"International Search Report and Written Opinion Issued in PCT Application No. PCT/US20/021299", dated May 13, 2020, 11 Pages.

* cited by examiner

DISCOVERY AND MATCHING OF INTERNET OF THINGS (IOT) DEVICES AND SERVICES USING A SECURE GLOBAL REGISTRY

BACKGROUND

As computing systems have become less expensive and smaller, they have begun to proliferate to almost all areas of life. Internet of Things (IoT) devices are network-connected devices that are placed in many physical spaces to enable people to interact with and gather information about their environment. For example, offices or homes may include numerous IoT devices that can be used to control locks, to manage indoor climate and receive climate information, to manage lighting and receive lighting information, to open and close doors, to perform cleaning functions, to control audio and/or video equipment, to provide voice interaction, to provide security and monitoring capabilities, etc. As such, IoT devices can process and generate vast amounts of information. As IoT devices proliferate, it is becoming increasingly difficult to manage the devices, their users, and to be able to process the data they generate.

SUMMARY

Described herein is a device (e.g., IoT device), comprising: a computer comprising a processor and a memory having computer-executable instructions stored thereupon which, when executed by the processor, cause the computer to: provide a globally unique device identifier of the device to a secure global registry; receive information from the secure global registry; and use the receiving information to connect to a cloud-based endpoint.

Also described herein is a method of registering a device, comprising: creating a globally unique identifier for the device; obtaining a public/private key pair for the device; and creating an initial entry in a secure global registry comprising the globally unique identifier and the device public key, wherein the secure global registry stores current cloud-based endpoint information for the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
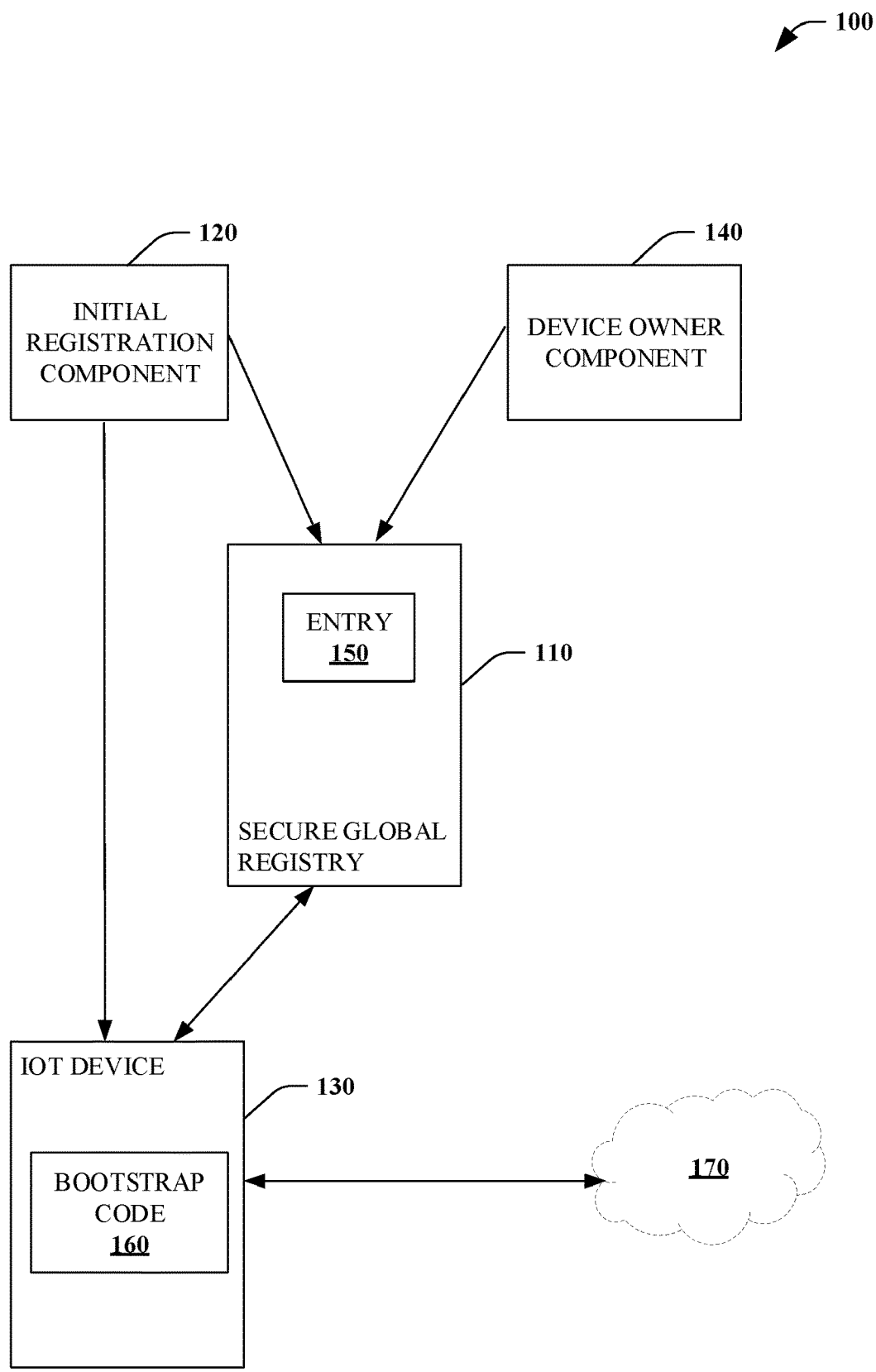
FIG. 1 is a functional block diagram that illustrates an IoT device registry system.

Various technologies pertaining to discovery and matching of Internet of Things (IoT) devices and services using a secure global registry are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding discovery and matching of Internet of Things (IoT) devices and services using a secure global registry. What follows are one or more exemplary systems and methods.

Aspects of the subject disclosure pertain to the technical problem of discovery and matching of Internet of Things (IoT) devices and services. The technical features associated with addressing this problem involve providing a secure global registry for IoT devices. Using the secure global registry, manufacturer(s), device owner(s), and/or IoT device(s) can securely store, change, and/or access information for and/or about a particular IoT device (e.g., cloud endpoint information). IoT devices can be manufactured as cloud-agnostic, with the IoT devices obtaining current connection information from the secure global registry. In some embodiments, the secure global registry comprises a private (e.g., consortium-based) blockchain distributed structure (e.g., database). Accordingly, aspects of these technical features exhibit technical effects of more efficiently and effectively discovering and matching IoT devices and services, for example, reducing computer resources (e.g., processing time and/or memory) and/or reducing bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Internet of Things (IoT) devices are network-connected devices that are placed in many physical spaces to enable people to interact with and gather information about their environment. Many manufacturer(s) of IoT devices do not want to require their IoT devices to be utilized with a particular cloud provider which would limit the manufacturer's their ability to manufacture at large scale. Further, during the life time of a particular device, the device may go through more than one owner. Additionally, a device owner may desire to change cloud providers for one, some or all of the IoT devices owned by the owner. Conventionally, there is not an easy way to transfer the ownership and/or cloud endpoint without re-flashing device at the transfer of ownership.

The system and method described herein include a secure global registry for IoT devices. Using the secure global registry, manufacturer(s), device owner(s), and/or IoT device(s) can securely store, change, and/or access information for and/or about a particular IoT device (e.g., cloud endpoint information). In this manner, IoT devices can be initially manufactured as cloud-agnostic, with the IoT devices obtaining current connection information from the secure global registry. Thus, connection information for a particular IoT device can be changed without having to re-flash the device, for example, upon a change of ownership or change in cloud-based service by the owner of the device. In some embodiments, the secure global registry comprises a private (e.g., consortium-based) blockchain distributed structure (e.g., database).

Referring to FIG. 1, an IoT device registry system 100 is illustrated. The system 100 includes a secure global registry 110, an initial registration component 120, an IoT device 130 and a device owner component 140.

For purposes of explanation and not limitation, the system 100 will be discussed with reference to a single IoT device 130 and a single owner. In some embodiments, the system 100 can be employed with a plurality of IoT devices 130 (e.g., hundreds, thousands, millions, etc.). In some embodiments, the system 100 can be employed with a plurality of owners (e.g., initial owner(s) and/or subsequent owner(s) of a particular IoT device 130).

In some embodiments, in order to facilitate secure transactions within the secure global registry 110, the initial registration component 120 and/or the device owner component 140 can have security credentials. In some embodiments, the security credentials can include a public/private cryptographic key pair. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others. For purposes of discussion, the credentials of the entity(ies) performing transactions (e.g., the initial registration component 120 and/or the device owner component 140) within the secure global registry 110 are sometimes referred to herein as "owner credentials", "owner public key", and/or "owner private key".

In some embodiments, the initial registration component 120 is associated with a manufacturer of the IoT device 130. In some embodiments, the initial registration component 120 is associated with a first owner or subsequent owner of the IoT device 130.

In some embodiments, each IoT device 130 is assigned a globally unique decentralized identifier (DID). The DID can be assigned by the initial registration component 120. The initial registration component 120 can store the DID on the IoT device 130.

DIDs allow for self-owned identity such that an IoT device 130 can control their digital identity. DIDs can be created, owned, and/or controlled independently of any particular organization (e.g., IoT device manufacturer, cloud-provider, IoT device owner) and can comprise globally unique identifiers linked to Decentralized Public Key Infrastructure (DPKI) metadata composed of JSON documents that contain public key material, authentication descriptor(s), and/or service endpoint(s). DIDs can possess unique characteristics such as greater assurance of immutability, and tamper evasiveness.

In some embodiments, in order to facilitate secure communications by the IoT device 130, the initial registration component 120 creates a public/private cryptographic key pair (sometimes referred to herein as "device public key" and "device private key") for the particular IoT device 130. The initial registration component 120 can store the device private key on the IoT device 130 (e.g., securely), and, the device public key can be stored in the secure global registry 110 for use in securely communicating with the IoT device 130.

The device public key can be used to encrypt data to be retrieved by the IoT device 130. The device private key can be used by the IoT device 130 to decrypt the encrypted data. In some embodiments, the device private key can used by the IoT device 130 to sign a message for authentication (e.g., to prove possession of the device private key).

In some embodiments, the device public/private cryptographic key pair are generated based upon an Edwards-curve digital signature algorithm (e.g., Ed25519). In some embodiments, the device public/private cryptographic key pair are generated based upon Rivest-Shamir-Adleman encryption algorithm (e.g., RSA encryption algorithm). In some embodiments, the device public/private cryptographic key pair are generated based upon an Advanced Encryption Standard (AES) algorithm. The device public/private cryptographic key pair are generated based upon Data Encryption Standard (DES) algorithm. In some embodiments, the device public/private cryptographic key pair are generated based upon Elliptic Curve Cryptography (ECC). In some embodiments, the device can utilize a symmetric key. In some embodiments, the device key (e.g., device private key) can be rotated (e.g., changed) by a subsequent owner.

The initial registration component 120 initiates creation of an entry 150 in the secure global registry 110 associated with a particular IoT device 130 using the DID. The initial registration component 120 can store information associated with the particular IoT device 130 in the entry 150 (e.g., DID, device public key). In some embodiments, the initial registration component 120 does not store endpoint information for and/or about a particular IoT device 130 (e.g., cloud endpoint information). In some embodiments, the initial registration component 120 stores endpoint information for and/or about a particular IoT device 130 (e.g., cloud endpoint information). In some embodiments, the endpoint information comprises an identifier (Uniform Resource Identifier (URI)) of a particular document stored in the secure global registry 110 or elsewhere (e.g., stored off-chain).

In some embodiments, the secure global registry 110 is a database with each entry 150 storing information associated with a particular IoT device 130. In some embodiments, the information comprises a DID, current configuration information for the particular IoT device 130 (e.g., endpoint information), reference to current configuration information for the particular IoT device 130 (e.g., associated device identifier foundation (DIF) hub), and/or a device public key associated with the particular IoT device 130. In some embodiments, some or all of the information is encrypted using the device public key. In some embodiments, the entry is signed using owner credentials such as an owner's private key.

In some embodiments, the secure global registry 110 is a public blockchain distributed structure. In some embodiments, as discussed more fully below, the secure global registry 110 is a private blockchain distributed structure.

The IoT device 130 includes bootstrap code 160 that facilitates communication between the IoT device 130 and the secure global registry 110. In some embodiments, the bootstrap code 160 is installed on the IoT device 130 by a manufacturer of the IoT device 130. In some embodiments, the bootstrap code 160 is installed by an owner of the IoT device 130.

In some embodiments, the bootstrap code 160 is executed upon power up of the IoT device 130. In some embodiments, the bootstrap code 160 is executed periodically (e.g., hourly, daily, monthly). In some embodiments, the bootstrap code 160 is executed in response to an event, for example, receipt of an electronic message requesting the IoT device 130 to acquire current information from the secure global registry 110. In some embodiments, the bootstrap code 160 is executed in response to user input (e.g., reset button) received via the IoT device 130.

In some embodiments, the bootstrap code 160 provides the DID of the particular IoT device 130 in a request to the secure global registry 110. In response to the request, the secure global registry 110 can provide data (e.g., unencrypted or encrypted) associated with current information associated with the DID (e.g., cloud endpoint information).

In some embodiments, the bootstrap code 160 provides the DID of the particular IoT device 130 and a message signed with the device private key to authenticate the IoT device 130. The secure global registry 110 can utilize the stored device public key to authenticate the particular IoT device 130. Only if authenticated, in response to the request, the secure global registry 110 can provide data (e.g., unencrypted or encrypted) associated with current information associated with the DID (e.g., cloud endpoint information). The bootstrap code 160 can utilize the received information to communicate with a particular cloud-based service 170.

In some embodiments, the bootstrap code 160 provides the DID of the particular IoT device 130 in a request to the secure global registry 110. In some embodiments, the secure global registry 110 can respond to with a challenge requiring the IoT device 130 to authenticate itself. For example, the secure global registry 110 can request that the IoT device 130 sign particular data or a particular message to prove its identity. In response, the bootstrap code 160 can sign the particular data or the particular message with the private key of the device, and, provide the signed message to the secure global registry 110.

The secure global registry 110 can utilize the stored device public key to authenticate the particular IoT device 130. Only if authenticated, in response to the request, the secure global registry 110 can provide data (e.g., unencrypted or encrypted) associated with current data associated with the DID (e.g., cloud endpoint information).

Next, change(s) affecting the IoT device 130 can occur. In some embodiments, ownership of the IoT device 130 can change from a first owner to a second owner which can affect the service endpoint. In some embodiments, a cloud endpoint of an owner can be changed from a first service endpoint to a second service endpoint. These change(s) can be made in the secure global registry 110 by using the device owner component 140 (e.g., by the owner and/or subsequent owner).

In some embodiments, the device owner component 140 and/or an entity (e.g., cloud provider or other external entity on behalf of the device owner) can update the entry 150 of the secure global registry 110 for the particular IoT device 130 based, at least in part, upon the DID. In some embodiments, the device owner component 140 can update information (e.g., cloud endpoint information) for the particular IoT device 130. In some embodiments, the device owner component 140 can update a reference to current configuration information for the particular IoT device 130 (e.g., associated device identifier foundation (DIF) hub). In some embodiments, the device owner component 140 the updated entry 150 is signed using owner credentials such as an owner's private key. Once the change(s) have been made to the entry 150, the IoT device 130 can receive the updated information, as discussed above.

Figure 2:
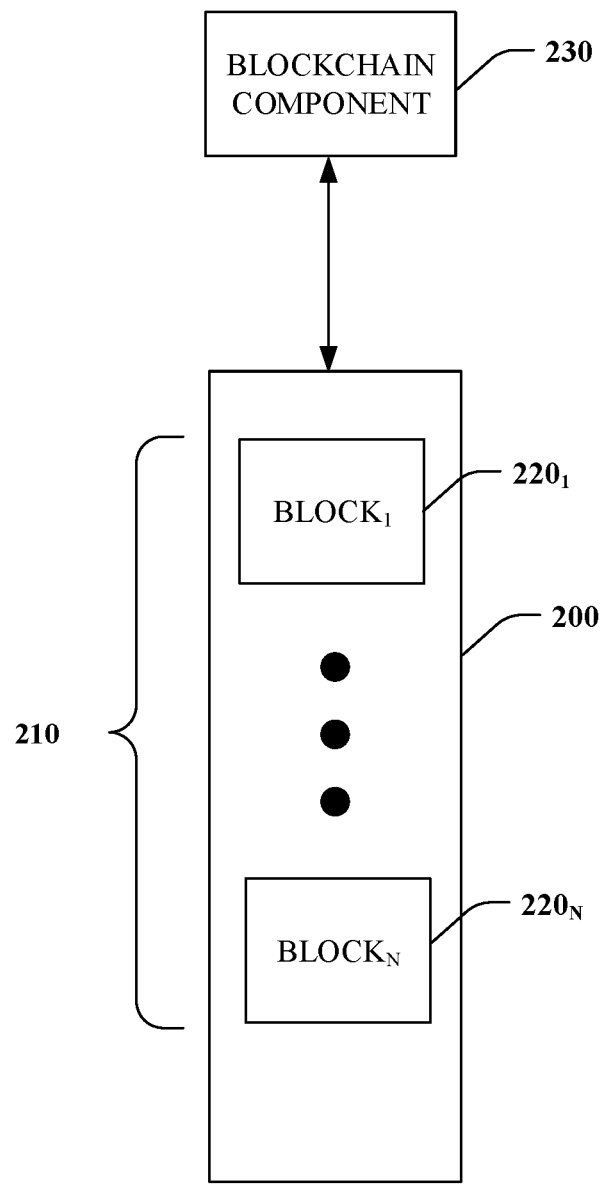
FIG. 2 is a functional block diagram that illustrates a distributed shared blockchain database.

Turning to FIG. 2, as discuss above, in some embodiments, the secure global registry 110 comprises a distributed shared blockchain database 200. A particular blockchain 210 of the database 200 includes one or more blocks 220 associated with a particular IoT device 130 based, at least in part, upon the DID.

For purposes of explanation and not limitation, an example initial block is set forth in Table 1:

TABLE 1

```
{
  "@context": "https://w3id.org/did/v1",
  "id": "did:example:123456789abcdefghi",
  "publicKey": [{
    "id": "did:example:123456789abcdefghi#keys-1",
    "type": "RsaVerificationKey2018",
    "owner": "did:example:123456789abcdefghi",
    "publicKeyPem": "-----BEGIN PUBLIC KEY...END PUBLIC KEY-----\r\n"
  }],
  "authentication": [{
    // this key can be used to authenticate as DID ... fghi
    "type": "RsaSignatureAuthentication2018",
    "publicKey": "did:example:123456789abcdefghi#keys-1"
  }],
  "service": [{
    // No end point initially set by the manufacturer.
  }]
}
```

In the example of Table 1, the device owner or manufacturer has not provided a service endpoint. The bootstrap code 160 of the IoT device 130 associated with this entry will not be able to connect to a cloud-based service using the information contained in this initial block.

Block(s) 220 are added to one or more blockchain(s) 210 using a blockchain component 230. In some embodiments, an initial registration component 120, a device owner component 130, and/or the secure global registry 110 can have a blockchain component 230.

For purposes of explanation and not limitation, a subsequent block is set forth in Table 2:

TABLE 2

```
{
 "@context": "https://w3id.org/did/v1",
 "id": "did:sampledevice:123456789abcdefghi",
 "publicKey": [{
  "id": "did:sampledevice:123456789abcdefghi#keys-1",
  "type": "RsaVerificationKey2018",
  "publicKeyPem": "-----BEGIN PUBLIC KEY...END PUBLIC KEY-----\r\n"
 }],
// owner has full permission on the block
 "owner": "did:sampleowner:123456789abcdefghi",
 "authentication": [{
  "type": "RsaSignatureAuthentication2018",
  "publicKey": "did:sampledevice:123456789abcdefghi#keys-1"
 }],
 "service": [{
  "type": "DPS",
  "serviceEndpoint": "https://global.azure-devices.net" }]
}
```

In the example of Table 2, the device owner has updated the distributed shared blockchain database 200 to include a "serviceEndpoint" which the bootstrap code 160 of the IoT device 130 will utilize to obtain information for connecting to a cloud-based service. In some embodiments, the bootstrap code 160 can download an appropriate software development kit (SDK) associated with the particular cloud based, at least in part, upon the received information. For example, a download location can be embedded in the DIF document for the device or it can be separately published in a universal registry for each cloud provider. Once the SDK is downloaded, the bootstrap code 160 can communicate with the cloud-based service using this SDK.

In some embodiments, each IoT device 130 of the system 100 is represented as a chain of events within the distributed shared blockchain database 200, for example, transferring transfers ownership from one party to another party, changing a cloud endpoint, etc. on a blockchain (e.g., with or without an intermediary). In some embodiments, each event can be cryptographically proofed by including the public key of the IoT device 130. Also, in some embodiments, each event (e.g., added block) can be digitally signed with the current owner's private key, for example, to allow for traceability, to identify current ownership of the IoT device 130, and/or to identify past ownership of the IoT device 130.

In some embodiments, blockchain can provide a mathematical hierarchy of verifiable events that is immutable and is verified at each stage between the participants (e.g., each party having a copy of the distributed shared blockchain database 200). Consensus protocols can be used to secure the blocks including cryptographic race, proof of work, proof of useful work, proof of stake, gossip about gossip and the like.

In response to an event (e.g., change of ownership, change of cloud endpoint), the blockchain component 230 can add a block 220 to the particular blockchain 210 associated with the particular IoT device 130 based upon the DID. In some embodiments, the blockchain component 230 can a block 220 to a plurality of blockchains 210, for example, to facilitate transfer of ownership and/or change of cloud endpoint for a plurality of IoT devices 130.

In some embodiments, each new block in a blockchain is filled with cryptographically proofed events until the block reaches a specified size limit. A hash digest of all the event identifiers within the block and the block header of the previous block can be added as the first event in the block.

In some embodiments, the distributed shared blockchain database 200 is private and only shared between members of a consortium. IoT device(s) 130 and/or initial registrant component(s) 120 (e.g., IoT device manufacturers, owners), and/or device owner components 140 (e.g., IoT device manufacturers, owner(s)) are able to access the distributed shared blockchain database 200 if they are a member of the consortium. Optionally, IoT device(s) 130 and/or initial registrant component(s) 120 (e.g., IoT device manufacturers, owners), and/or device owner components 140 (e.g., IoT device manufacturers, owner(s)) are able to access the distributed shared blockchain database 200 through a member of the consortium (e.g., upon presentation of suitable credential(s) to the member, who is responsible for authentication).

FIGS. 3-6 illustrate exemplary methodologies relating to secure global registry(ies). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein. Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
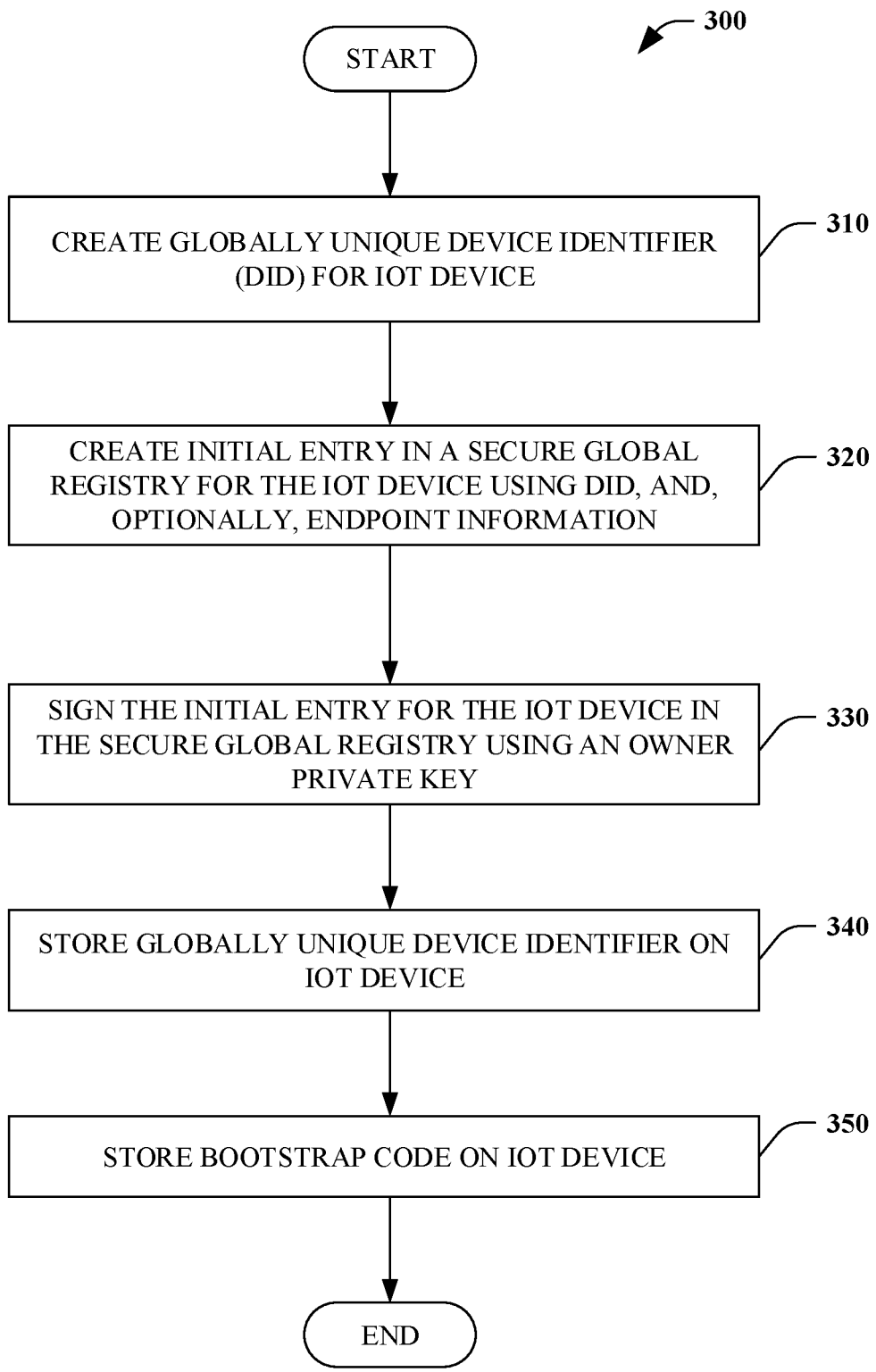
FIG. 3 is a flow chart that illustrates a method of registering a device.

Referring to FIG. 3, a method of registering a device 300 is illustrated. In some embodiments, the method 300 is performed by the initial registration component 120 to register the IoT device 130.

At 310, a globally unique device identifier (DID) is created for an IoT device. At 320, an initial entry in a secure global registry is created using the DID, and, optionally, endpoint information, wherein the secure global registry stores current cloud-based endpoint information for the device. At 330, the initial entry in the secure global registry entry is signed using an owner private key (e.g., by the initial registration component 120). At 340, the globally unique device identifier (DID) is stored on the IoT device. At 350, bootstrap code (e.g., bootstrap code 160) is stored on the IoT device.

Figure 4:
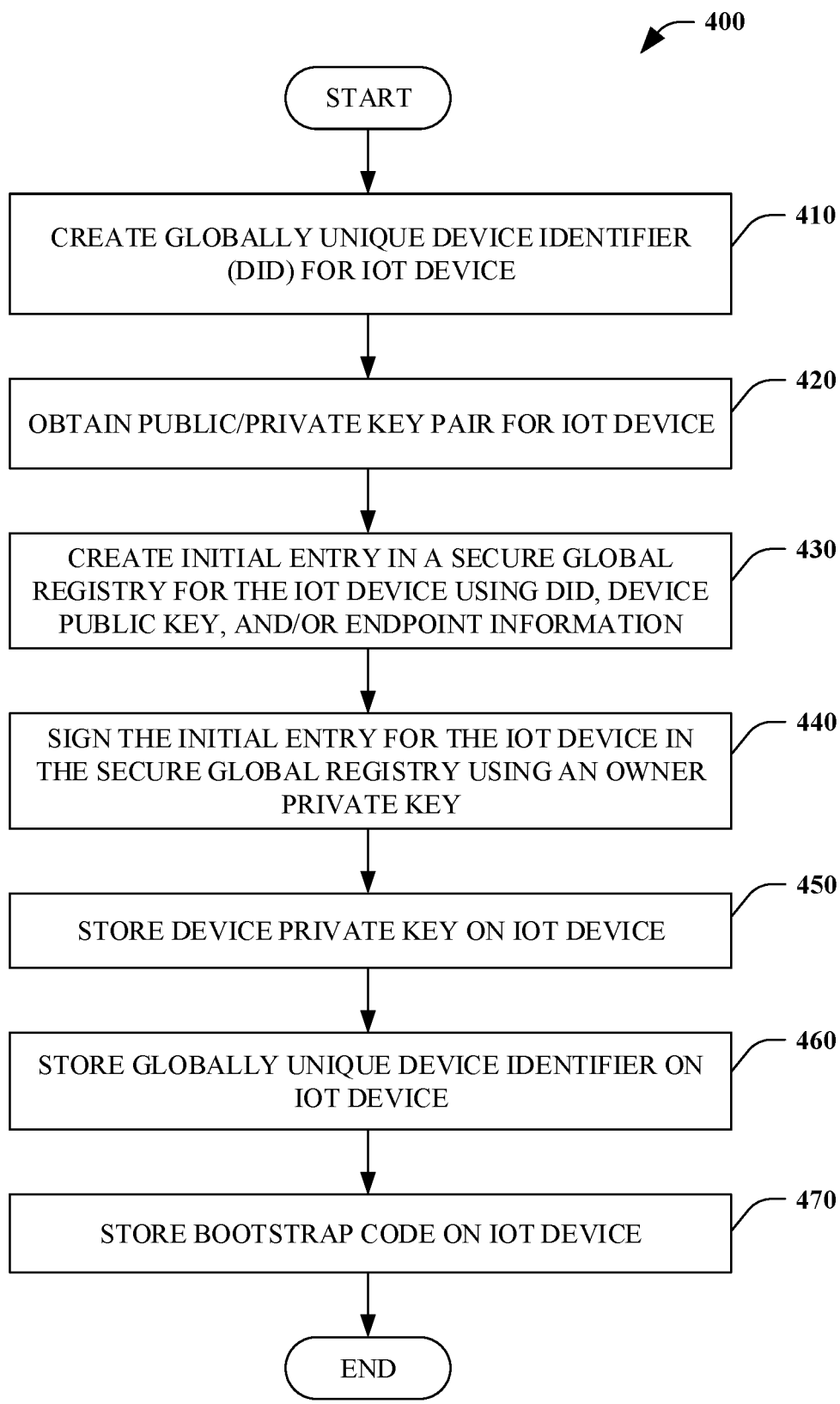
FIG. 4 is a flow chart that illustrates a method of registering a device.

Referring to FIG. 4, a method of registering a device 400 is illustrated. In some embodiments, the method 400 is performed by the initial registration component 120 to register the IoT device 130.

At 410, a globally unique device identifier (DID) is created for an IoT device. At 420, a public/private key pair is obtained (e.g., created) for the IoT device. At 430, an initial entry in a secure global registry is created using the DID, the device public key, and/or endpoint information, wherein the secure global registry stores current cloud-based endpoint information for the device. At 440, the initial entry in the secure global registry entry is signed using an owner private key (e.g., by the initial registration component 120).

At 450, the device private key is stored on the IoT device. At 460, the globally unique device identifier (DID) is stored on the IoT device. At 470, bootstrap code (e.g., bootstrap code 160) is stored on the IoT device.

Figure 5:
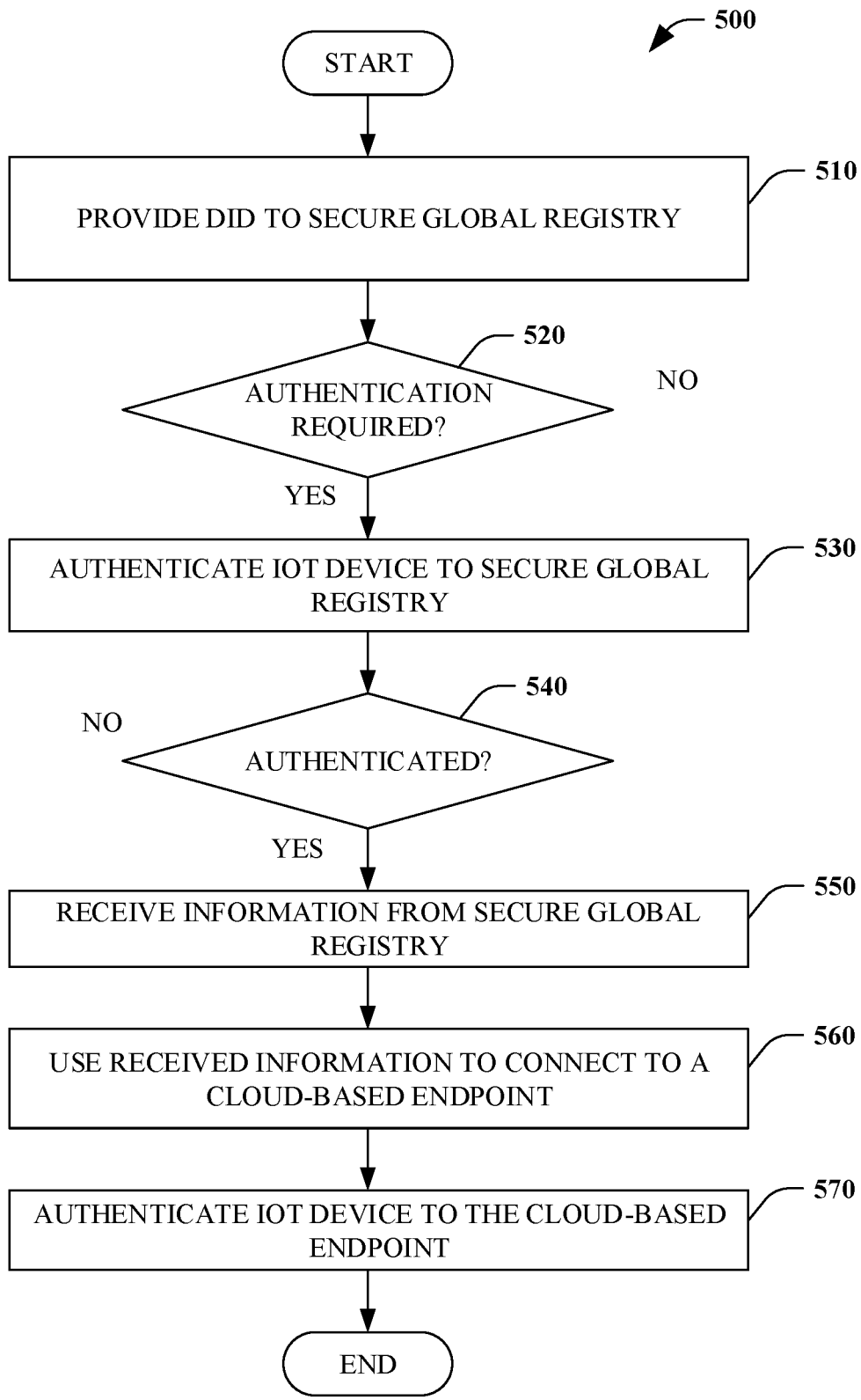
FIG. 5 is a flow chart that illustrates a method of discovering information from a secured global registry.

Turning to FIG. 5, a method of discovering information from a secured global registry 500 is illustrated. In some embodiments, the method 500 is performed by the bootstrap code 160 of the IoT device 130.

At 510, a DID (e.g., globally unique device identifier) is provided to a secure global registry. In some embodiments, the secure global registry is a single secure database. In some embodiments, the secure global registry is a public blockchain distributed structure. In some embodiments, the secure global registry is a private blockchain distributed structure.

At 520, a determination is made as to whether authentication is required by the secure global registry. In some embodiments, the determination can be made by the bootstrap code 160 (e.g., hardcoded). In some embodiments, the determination can be based upon receipt of a challenge (e.g., request for authentication) from the secure global registry. If the determination at 520 is YES, at 530, the IoT device is authenticated to the secure global registry. For example, the bootstrap code 160 can sign a message using a stored device private key and present the signed message to the secure global registry to authenticate the IoT device. At 540, a determination is made as to whether the IoT device has been authenticated. If the determination at 540 is NO, no further processing occurs. If the determination at 540 is YES, processing continues at 550. If the determination at 520 is NO, processing continues at 550.

At 550, information (e.g., endpoint connection information) is received from the secure global registry. At 560, the received information is used to connect to the cloud-based endpoint. In some embodiments, the bootstrap code 160 can download an appropriate software development kit (SDK) associated with the particular cloud based, at least in part, upon the received information. For example, a download location can be embedded in the DIF document for the device or it can be separately published in a universal registry for each cloud provider. Once the SDK is downloaded, the bootstrap code 160 can communicate with the cloud-based service using this SDK.

At 570, the IoT device is authenticated to the cloud-based endpoint. For example, a cloud-based service associated with the cloud-based endpoint can verify that the authentication information provided by the IoT device corresponds to a public certificate in a DIF file associated with the particular IoT device.

Figure 6:
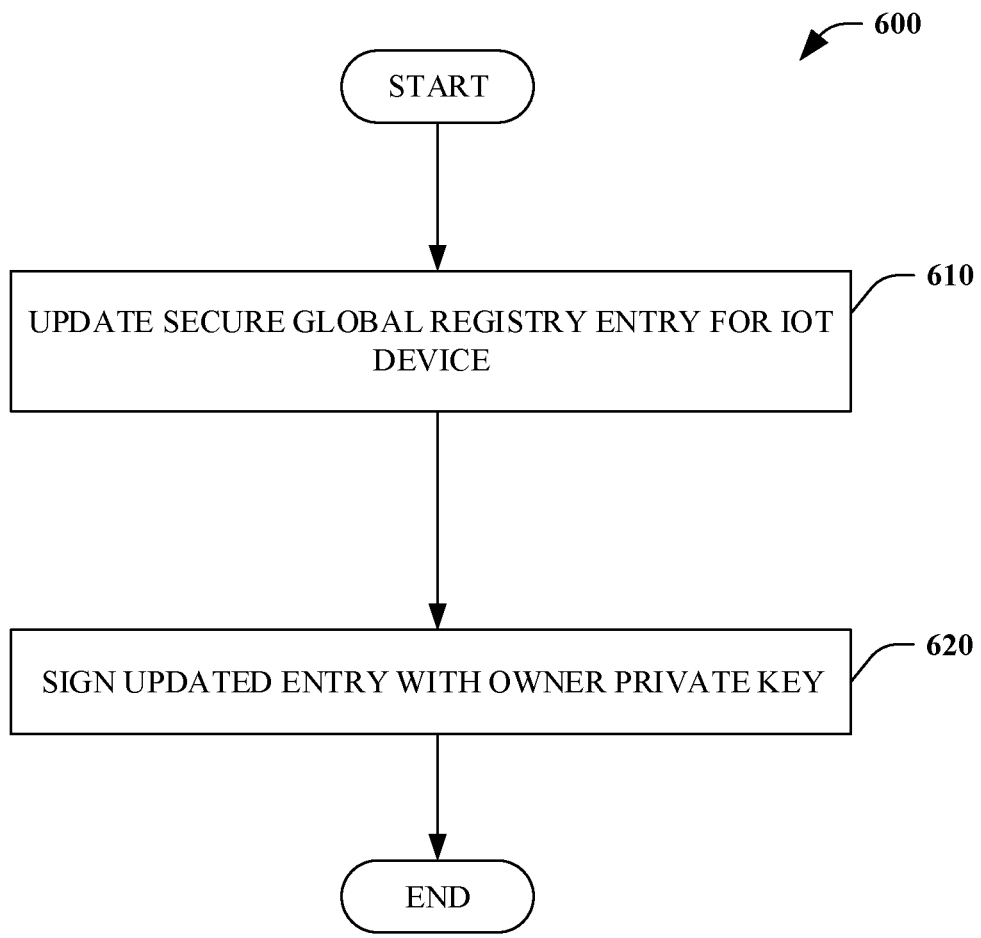
FIG. 6 is a flow chart that illustrates a method of updating secure global registry information.

Referring next to FIG. 6, a method of updating secure global registry information 600 is illustrated. In some embodiments, the method 600 is performed by the device owner component 140 and/or the blockchain component 230.

At 610, a secure global registry entry for a particular IoT device is updated. At 620, the updated entry is signed with the owner private key.

Described herein is a device, comprising: a computer comprising a processor and a memory having computer-executable instructions stored thereupon which, when executed by the processor, cause the computer to: provide a globally unique device identifier of the device to a secure global registry; receive information from the secure global registry; and use the receiving information to connect to a cloud-based endpoint.

The device can further include wherein the secure global registry comprises a single secure database. The device can further include wherein the secure global registry comprises a public blockchain distributed structure. The device can further include wherein the secure global registry comprises a private blockchain distributed structure.

The device can further include the memory having further computer-executable instructions stored thereupon which, when executed by the processor, cause the computer to: authenticate the device to the secure global registry using a device private key. The device can further include the memory having further computer-executable instructions stored thereupon which, when executed by the processor, cause the computer to: authenticate the device to the cloud-based endpoint.

The device can further include, wherein the computer-executable instructions are executed periodically. The device can further include wherein the computer-executable instructions are executed in response to receipt of an electronic message requesting the device to acquire current information from the secure global registry. The device can further include wherein the computer-executable instructions are executed in response to received user input.

Described herein is a method of registering a device, comprising: creating a globally unique identifier for the device; obtaining a public/private key pair for the device; and creating an initial entry in a secure global registry comprising the globally unique identifier and the device public key, wherein the secure global registry stores current cloud-based endpoint information for the device.

The method can further include signing the initial entry in the secure global registry using an owner private key. The method can further include storing the device private key on the device; and storing the globally unique identifier on the device. The method can further include storing bootstrap code on the device, wherein the bootstrap code facilitates communication between the device and the secure global registry.

The method can further include wherein the secure global registry comprises a public blockchain distributed structure. The method can further include wherein the secure global registry comprises a private blockchain distributed structure.

Described herein is a computer storage media storing computer-readable instructions that when executed cause a computing device to: create a globally unique identifier for the device; obtain a public/private key pair for the device; and create an initial entry in a secure global registry comprising the globally unique identifier and the device public key, wherein the secure global registry stores current cloud-based endpoint information for the device.

The computer storage media can store further computer-readable instructions that when executed cause a computing device to: sign the initial entry in the secure global registry using an owner private key. The computer storage media can store further computer-readable instructions that when executed cause a computing device to: store the device private key on the device; and store the globally unique identifier on the device.

The computer storage media can store further computer-readable instructions that when executed cause a computing device to: store bootstrap code on the device, wherein the bootstrap code facilitates communication between the device and the secure global registry. The computer storage media can further include wherein the secure global registry comprises a private blockchain distributed structure.

Figure 7:
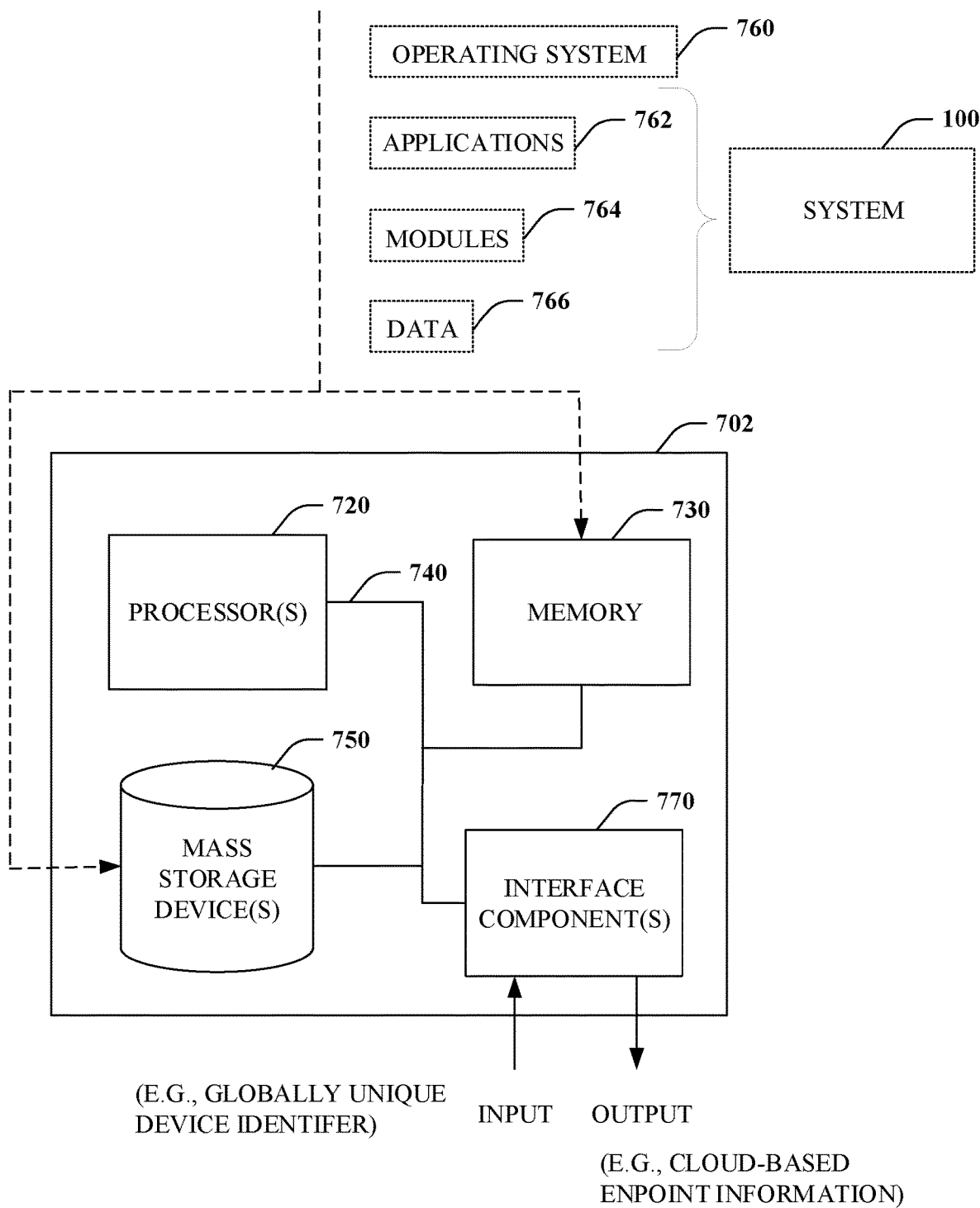
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in an IoT device registry system 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A device, comprising:
    a processor; and
    computer storage media having computer-executable instructions stored thereupon which, when executed by the processor, cause the device to:
    at a first time:
        provide a globally unique device identifier that uniquely identifies the device to a secure global blockchain database;
        receive first cloud-based connection information associated with the globally unique device identifier from the secure global blockchain database, the first cloud-based connection information designating a first cloud-based service for the device to connect to, wherein the first cloud-based connection information is stored by the secure global blockchain database in one or more first blockchain entries that include a device public key of the device; and
        connect the device to the first cloud-based service designated by the first cloud-based connection information received from the secure global blockchain database; and
    at a second time:
        provide the globally unique device identifier that uniquely identifies the device to the secure global blockchain database;
        receive second cloud-based connection information associated with the globally unique device identifier from the secure global blockchain database, the second cloud-based connection information designating a second cloud-based service for the device to connect to, wherein the second cloud-based connection information is stored by the secure global blockchain database in one or more second blockchain entries that include the device public key of the device; and
        connect the device to the second cloud-based service designated by the second cloud-based connection information received from the secure global blockchain database.

2. The device of claim 1, wherein the secure global blockchain database comprises a private blockchain distributed structure.

3. The device of claim 1, the computer storage media having further computer-executable instructions stored thereupon which, when executed by the processor, cause the device to:
    authenticate the device to the secure global blockchain database at the first time and the second time using a device private key corresponding to the device public key.

4. The device of claim 1, wherein the computer-executable instructions are executed at the first time in response to receipt of a first electronic message and at the second time in response to receipt of a second electronic message, the first and second electronic messages requesting the device to acquire current connection information from the secure global blockchain database.

5. The device of claim 1, wherein the computer-executable instructions are executed at the first time and at the second time in response to received user input.

6. The device of claim 1, the computer-executable instructions stored on the computer storage media comprising bootstrap code that executes on the processor responsive to power-up of the device and causes the device to:
    upon a first power-up of the device:
        send the globally unique device identifier to the secure global blockchain database;
        receive the first cloud-based connection information from the secure global blockchain database; and
        contact the first cloud-based service after receiving the first cloud-based connection information from the secure global blockchain database; and
    upon a second power-up of the device:
        send the globally unique device identifier to the secure global blockchain database;
        receive the second cloud-based connection information from the secure global blockchain database; and
        contact the second cloud-based service after receiving the second cloud-based connection information from the secure global blockchain database.

7. The device of claim 1, the computer-executable instructions stored on the computer storage media comprising bootstrap code that executes on the processor responsive to user input resetting the device and causes the device to:
  responsive to first user input resetting the device:
    send the globally unique device identifier to the secure global blockchain database;
    receive the first cloud-based connection information from the secure global blockchain database; and
    contact the first cloud-based service after receiving the first cloud-based connection information from the secure global blockchain database; and
  responsive to second user input resetting the device:
    send the globally unique device identifier to the secure global blockchain database;
    receive the second cloud-based connection information from the secure global blockchain database; and
    contact the second cloud-based service after receiving the second cloud-based connection information from the secure global blockchain database.

8. The device of claim 1, the computer-executable instructions stored on the computer storage media comprising bootstrap code that executes on the processor periodically and causes the device to:
  for a first periodic execution of the bootstrap code:
    send the globally unique device identifier to the secure global blockchain database;
    receive the first cloud-based connection information from the secure global blockchain database; and
    contact the first cloud-based service after receiving the first cloud-based connection information from the secure global blockchain database; and
  for a second periodic execution of the bootstrap code:
    send the globally unique device identifier to the secure global blockchain database;
    receive the second cloud-based connection information from the secure global blockchain database; and
    contact the second cloud-based service after receiving the second cloud-based connection information from the secure global blockchain database.

9. The device of claim 1, the computer-executable instructions stored on the computer storage media comprising bootstrap code that executes on the processor and causes the device to:
  for a first execution of the bootstrap code:
    receive a first challenge from the secure global blockchain database;
    in response to the first challenge, sign a first message using a device private key of the device;
    present the signed first message to the secure global blockchain database;
    receive the first cloud-based connection information from the secure global blockchain database responsive to authentication of the signed first message; and
    contact the first cloud-based service after receiving the first cloud-based connection information from the secure global blockchain database; and
  for a second execution of the bootstrap code:
    receive a second challenge from the secure global blockchain database;
    in response to the second challenge, sign a second message using the device private key;
    present the signed second message to the secure global blockchain database;
    receive the second cloud-based connection information from the secure global blockchain database responsive to authentication of the signed second message; and
    contact the second cloud-based service after receiving the second cloud-based connection information from the secure global blockchain database.

10. A method, comprising:
  obtaining a globally unique identifier that uniquely identifies a device;
  obtaining a public/private key pair for the device, the public/private key pair comprising a device private key and a device public key;
  at a first time, creating one or more first blockchain entries in a secure global blockchain database, the one or more first blockchain entries comprising the globally unique identifier that uniquely identifies the device, the device public key, and first cloud-based connection information for the device, wherein the first cloud-based connection information identifies a first cloud-based endpoint to which the device is designated to connect upon subsequently accessing the secure global registry blockchain database to obtain the first cloud-based connection information; and
  at a second time after the first time, creating one or more second blockchain entries in the secure global blockchain database, the one or more second blockchain entries comprising the globally unique identifier that uniquely identifies the device, the device public key, and second cloud-based connection information for the device, wherein the second cloud-based connection information identifies a second cloud-based endpoint, other than the first cloud-based endpoint, to which the device is designated to connect upon subsequently accessing the secure global blockchain database to obtain the second cloud-based connection information.

11. The method of claim 10, further comprising:
  signing the one or more first blockchain entries and the one or more second blockchain entries using an owner private key.

12. The method of claim 10, further comprising:
  executing bootstrap code stored on the device, wherein the bootstrap code causes the device to:
  upon a first power-up of the device:
    send the globally unique identifier to the secure global blockchain database;
    receive the first cloud-based connection information from the secure global blockchain database; and
    contact the first cloud-based endpoint after receiving the first cloud-based connection information from the secure global blockchain database; and
  upon a second power-up of the device:
    send the globally unique identifier to the secure global blockchain database;
    receive the second cloud-based connection information from the secure global blockchain database; and
    contact the second cloud-based endpoint after receiving the second cloud-based connection information from the secure global blockchain database.

13. The method of claim 10, further comprising:
  executing bootstrap code stored on the device, wherein the bootstrap code causes the device to:
  responsive to first user input resetting the device:
    send the globally unique identifier to the secure global blockchain database;
    receive the first cloud-based connection information from the secure global blockchain database; and contact the first cloud-based endpoint after receiving the first cloud-based connection information from the secure global blockchain database; and responsive to second user input resetting the device:
send the globally unique identifier to the secure global blockchain database;
receive the second cloud-based connection information from the secure global blockchain database; and
contact the second cloud-based endpoint after receiving the second cloud-based connection information from the secure global blockchain database.

14. The method of claim 10, further comprising:
executing bootstrap code stored on the device, wherein the bootstrap code causes the device to periodically check for new connection information and:
for a first periodic execution of the bootstrap code:
send the globally unique identifier to the secure global blockchain database;
receive the first cloud-based connection information from the secure global blockchain database; and
contact the first cloud-based endpoint after receiving the first cloud-based connection information from the secure global blockchain database; and
for a second periodic execution of the bootstrap code:
send the globally unique identifier to the secure global blockchain database;
receive the second cloud-based connection information from the secure global blockchain database; and
contact the second cloud-based endpoint after receiving the second cloud-based connection information from the secure global blockchain database.

15. The method of claim 10, further comprising:
executing bootstrap code stored on the device, wherein the bootstrap code causes the device to:
for a first execution of the bootstrap code:
receive a first challenge from the secure global blockchain database;
in response to the first challenge, sign a first message using the device private key;
present the signed first message to the secure global blockchain database;
receive the first cloud-based connection information from the secure global blockchain database responsive to authentication of the signed first message; and
contact the first cloud-based endpoint after receiving the first cloud-based connection information from the secure global blockchain database; and
for a second execution of the bootstrap code:
receive a second challenge from the secure global blockchain database;
in response to the second challenge, sign a second message using the device private key;
present the signed second message to the secure global blockchain database;
receive the second cloud-based connection information from the secure global blockchain database responsive to authentication of the signed second message; and
contact the second cloud-based endpoint after receiving the second cloud-based connection information from the secure global blockchain database.

16. One or more computer storage media storing computer-readable instructions that, when executed, cause a processor to:
obtain a globally unique identifier that uniquely identifies a device;
obtain a public/private key pair for the device, the public/private key pair comprising a device private key and a device public key;
at a first time, create one or more first blockchain entries in a secure global blockchain database, the one or more first blockchain entries comprising the device public key and first cloud-based connection information for the device, wherein the first cloud-based connection information identifies a first cloud-based endpoint to which the device is designated to connect upon subsequently accessing the secure global blockchain database to obtain the first cloud-based connection information; and
at a second time after the first time, create one or more second blockchain entries in the secure global blockchain database, the one or more second blockchain entries comprising the globally unique identifier that uniquely identifies the device, the device public key, and second cloud-based connection information for the device, wherein the second cloud-based connection information identifies a second cloud-based endpoint, other than the first cloud-based endpoint, to which the device is designated to connect upon subsequently accessing the secure global blockchain database to obtain the second cloud-based connection information.

17. The one or more computer storage media of claim 16, storing further computer-readable instructions that, when executed, cause the processor to:
sign the one or more first blockchain entries and the one or more second blockchain entries in the secure global blockchain database using an owner private key.

18. The one or more computer storage media of claim 16, storing further computer-readable instructions that, when executed, cause the processor to:
store the device private key on the device; and
store the globally unique identifier on the device.

19. The one or more computer storage media of claim 16, storing further computer-readable instructions that, when executed, cause the processor to:
store bootstrap code on the device, wherein the bootstrap code facilitates communication between the device and the secure global blockchain database.

20. The one or more computer storage media of claim 16, wherein the secure global blockchain database comprises a private blockchain distributed structure.

* * * * *